United States Patent [19]

McNeill

[11] Patent Number: 5,743,300

[45] Date of Patent: Apr. 28, 1998

[54] TUBE WITH LINE MEMBER

[75] Inventor: Paul Anthony McNeill, Paddington, Australia

[73] Assignee: PPI Corporation Pty. Ltd., Queensland, Australia

[21] Appl. No.: 781,496

[22] Filed: Jan. 13, 1997

[30] Foreign Application Priority Data

Jan. 25, 1996 [AU] Australia ................. PN7730
Jul. 8, 1996 [AU] Australia ................. PO0872

[51] Int. Cl.[6] ............... F16L 3/00; E21F 17/02; B05B 15/06
[52] U.S. Cl. .......... 138/107; 138/111; 138/103; 248/49; 248/61; 239/207; 239/273
[58] Field of Search ............ 138/107, 106, 138/111, 103, 114; 248/61, 49, 58, 59, 60, 75; 174/101.5; 405/154; 239/542, 200, 207, 273, 289

[56] References Cited

U.S. PATENT DOCUMENTS

| 1,220,279 | 3/1917 | Sexton | 239/207 X |
|---|---|---|---|
| 2,539,181 | 11/1951 | Larsen | 239/207 X |
| 2,837,120 | 6/1958 | Galloway | 138/107 |
| 2,940,466 | 6/1960 | Speights | 239/289 X |
| 2,956,311 | 10/1960 | Raydt et al. | 174/41 X |
| 3,207,836 | 9/1965 | Slechta | 138/107 X |
| 3,933,313 | 1/1976 | Waite | 239/273 |
| 4,037,788 | 7/1977 | Riley | 239/207 |
| 4,044,951 | 8/1977 | Waite | 239/273 X |
| 4,160,872 | 7/1979 | Lundberg et al. | 174/101.5 |
| 4,378,462 | 3/1983 | Arnold, Jr. et al. | 174/70 A |
| 4,424,936 | 1/1984 | Marc | 138/45 X |
| 4,650,715 | 3/1987 | Voser | 174/41 X |
| 4,796,660 | 1/1989 | Bron | 138/42 X |
| 5,330,104 | 7/1994 | Marcus | 239/273 X |

FOREIGN PATENT DOCUMENTS

| A-55370/59 | 12/1962 | Australia . | |
| B-44168/68 | 4/1971 | Australia . | |
| B-75565/74 | 5/1976 | Australia . | |
| 547940 | 9/1956 | Italy | 174/70 A |
| 647226 | 12/1950 | United Kingdom . | |
| 865783 | 4/1961 | United Kingdom . | |
| 1003624 | 9/1965 | United Kingdom . | |
| 1232996 | 5/1971 | United Kingdom | 138/107 |

OTHER PUBLICATIONS

International Search Report dated Feb. 27, 1997 from the Australian Industrial Property Organisation.

*Primary Examiner*—Patrick F. Brinson
*Attorney, Agent, or Firm*—Panitch Schwarze Jacobs & Nadel, P.C.

[57] ABSTRACT

A flexible plastic water tube which can be stored on a roll has a flexible but substantially inextensible line member attached to it and can include a number of pre-attached drippers. The tube can be stretched between spaced apart supports with the line member preventing undesirable sagging. The tube can therefor be made from inexpensive thin walled plastic.

13 Claims, 1 Drawing Sheet

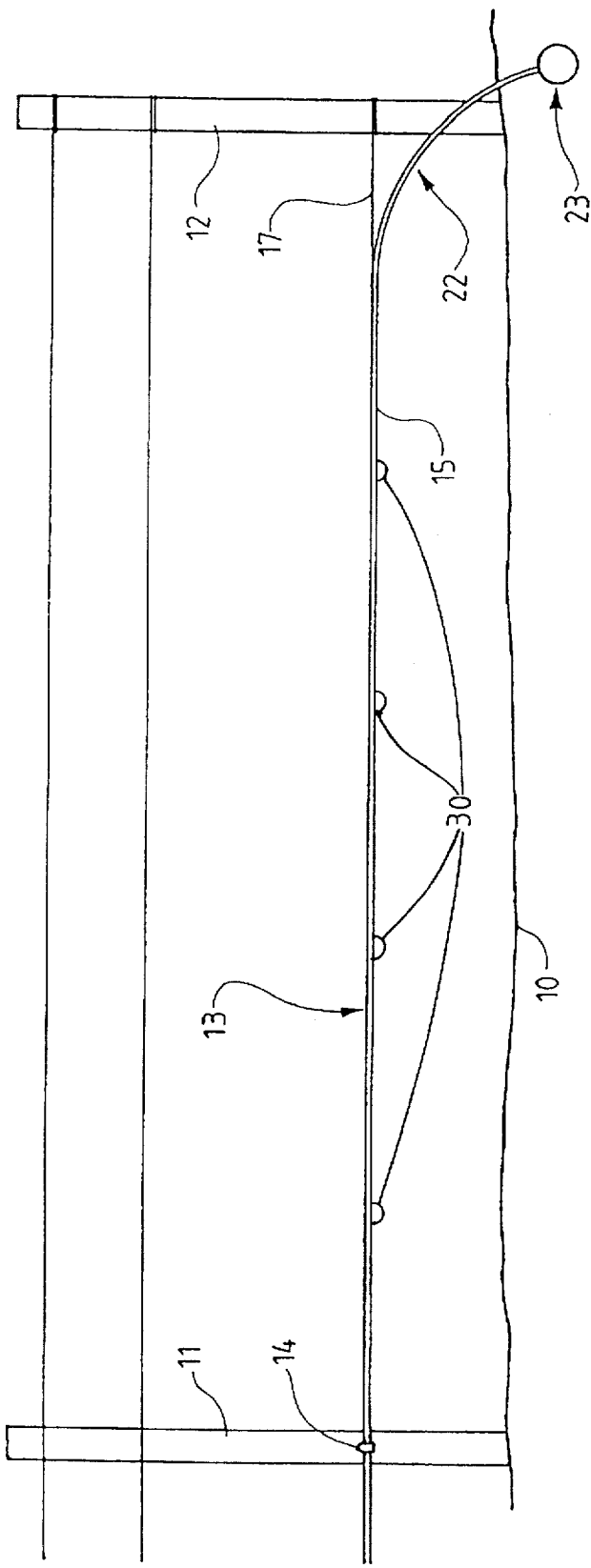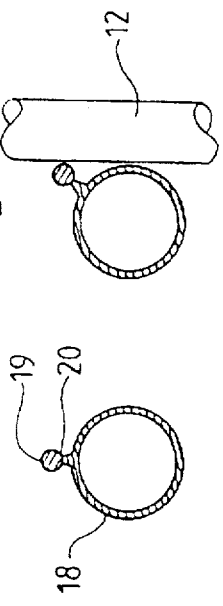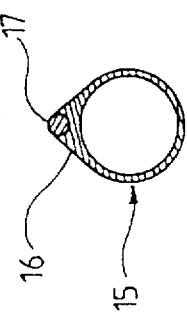

TUBE WITH LINE MEMBER

FIELD OF THE INVENTION

This invention relates to a tube which can be used to convey fluids such as water and which has a line member to allow the tube to be supported above a ground surface.

BACKGROUND ART

In various industries, and by way of example only, the wine industry, irrigation tubing is commonly suspended above the ground. It is found that the tubing itself, which is typically black plastic tube, is too flexible, and has a tendency to sag unless it is supported by a large number of spaced apart posts. Clearly, having a large number of spaced apart posts is not desirable. Therefore, it is known to have the posts spaced more widely apart and to have a wire stretched between adjacent posts. The plastic tubing is then clipped to the wire at spaced intervals to prevent it from sagging.

There are a number of known types of clips which can attach the tubing to the wire, these including ratchet clips, zip ties, a product available in Australia called a FLOTYE which is a simple plastic loop, and a spirally-cut plastic product which can be wound around the tubing and the wire.

A disadvantage with this arrangement is that a considerable amount of labour is involved in installation, since the wire has to be initially unrolled and tensioned between the posts, the tube then has to be unrolled and placed on the ground and the tube then needs to be manually lifted to the wire and clipped to the wire at spaced intervals using any one of the known types of clips.

Even with the above arrangement, some sagging of the plastic tube can still occur. Sagging around a drip emitter on the tube will cause water to run along the outside of the tube to the lowest point and drip from this point, rather than at the drip emitter point. This causes a wrong distribution of water.

It is also found that with the above arrangements, the plastic tubing can still twist along its length which causes the attached sprayers or drippers to move and distribute water in the wrong place.

OBJECT OF THE INVENTION

It is object of the invention to provide an arrangement which may overcome at least some of the abovementioned disadvantages or provide the public with a useful or commercial choice.

In one form, the invention resides in a flexible tube arrangement, including a tube through which a fluid can be conveyed, and a line member.

The flexible tube may be formed from plastics, such as thermoplastics, examples of which are polyethylene and polypropylene. The tube may be formed from known types of plastic irrigation tubing, including tubing stabilised against ultraviolet degradation with the inclusion of carbon black or other types of stabilisers.

The diameter of the tubing may vary to suit the requirements thereof, but it is typical for vineyard irrigation uses, that the tubing has a diameter of between 10 mm–30 mm. The invention however does not limit the diameter of the tubing and tubing of larger or smaller diameters or cross-section sizes may be used in other circumstances.

The tube is flexible in the sense that it is insufficiently rigid to allow it to be supported between desirably spaced apart supports without an undesirable amount of sagging. As a preferred tube is a thin walled thermoplastic tube, such a product does exhibit sagging.

The line member may comprise a metal wire, plastic wire, or composite wire. The diameter or cross-sectional size of the wire will depend upon the distance between supports, the weight of the tube to be supported, the weight and amount of fluid to be conveyed through the tube, and the like. However, a metal wire having a diameter of between 1 mm–5 mm is useful.

It is preferred that the line member is also sufficiently flexible such that the formed tube, including the line member, can be stored on a roll, or formed into a roll for ease of storage and transportation.

The line member preferably extends along the tube and is preferably parallel to the longitudinal axis of the tube.

How the line member is formed with the tube can be the subject of variation. For instance, the line member may extend along and through the wall of the tube. If the tube is of a relatively thin wall section (for instance, between 2 mm–5 mm wall thickness), the tube may be provided with a thickened wall portion or zone along and through which the line member can pass.

The wall of the tube, or the thickened wall portion, may be formed with an opening through which the line member can be threaded. Alternatively, the line member may be formed integrally with the tube, for instance, as the tube is being extruded.

The line member may have a degree of longitudinal movement relative to the tube, by which is meant that the line member has a degree of sliding movement. Alternatively, the line member can be rigidly fixed to the tube by which is meant that the line member cannot slide relative to the tube.

In further variations, the flexible tube arrangement may have a primary tube through which the fluid can be conveyed, and a separate bead, rib, thickened portion, or tube through which, or in which, the line member can be formed, with this second portion being attached to the main tube, either continuously or intermittently. It is also envisaged that the line member is glued to the tube wall or that the line member has a portion that can be heat or RF sealed to the tube wall.

It is envisaged that there may be circumstances where the tube need not be continuously attached to the line member, and therefore the tube may comprise a multiplicity of perhaps closely spaced apart attachment points to allow the line member to be attached to the tubular member. For instance, the tube may be formed with an inverted C channel portion which can function as a hook to allow the tube to be readily clipped to the wire. If the channel is sized correctly, a wire can be rolled or otherwise inserted into the channel as the tube is being formed or thereafter.

As the tubing can be stretched between post members without appreciable twisting, it is now possible to provide integral drippers on or in the tube. Previously, integral drippers had reduced practicality as the position of the integral dripper could not be adjusted and if the tube twisted on the external line member, the integral dripper could be rendered useless.

To provide the tube with an outward streamlined profile, it is preferred that an integral dripper is fitted inside the tube body. Such integral drippers are known and typically comprise a cylindrical sleeve, a boat-shaped dripper, or other shaped body of thermoplastic material which is inserted into the tube body. The dripper can have an outer face (that is, the face abutting against the internal wall of the tube), and this outer face can be provided with various channels and profiles through which water can flow towards a hole punched in the tube wall. One type of arrangement uses a labyrinth through which the water must flow which functions to decrease the pressure of the outgoing water causing it to drip out instead of spraying out as it otherwise would. Another type of dripper can additionally include some form of resilient member to compensate for pressure variations in the tube. That is, this type of pressure compensating dripper causes water to drip out of the holes in the tube at a constant rate irrespective of the variation in water pressure within the tube.

The integral drippers are preferably fitted to the tube as the tube is extruded. The drippers can be inserted into the centre of the tube as the tube is being extruded. A cross-head extruder can be used in a manner similar to the method by which the line member is attached to the tube.

The spacing of the drippers in the tube can vary to suit. Typically, drippers are spaced from between 30 centimeters apart to several meters apart.

As the tube according to the invention has a line member, the tube can be fixed taut between vertical supports ensuring that the emitted water does not run along the outside wall of the tubing and drip where it is not intended. Also, as the tube according to the invention has reduced twisting, drippers can now be integrally fitted to the tube

BRIEF DESCRIPTION OF THE DRAWINGS

An embodiment of the invention will be illustrated by reference to the accompanying drawing in which FIG. 1 is a view of a tube according to the invention supported between a pair of spaced apart posts;

FIGS. 2A–2C are cross-section views of various embodiments of the invention.

BEST MODE

Referring initially to FIG. 1, there is shown an arrangement which can be used in vineyards. FIG. 1 shows a ground surface 10 and a pair spaced apart posts 11, 12. A flexible tube arrangement 13 according to the invention has a series of integral spaced apart drippers 30 and is attached between the pair of spaced apart posts 11, 12. On post 11, tube arrangement 13 is attached via a pipe saddle 14.

FIGS. 2A–2C shows two variations of the tube arrangement. In FIG. 2A, the tube arrangement comprises a plastic thin walled black extruded thermoplastic tube 15 having a thickened portion 16 through which and along which a metal wire 17 passes.

FIG. 2B shows a variation where the tubular wall 18, rather than having a thickened portion, has a separate bead or rib 19 through which the line member 20 passes.

FIG. 2C illustrates the variation of FIG. 2B by showing its orientation relative to the post 12.

In use, a coil of the tubing arrangement can be transported to site, uncoiled on the ground and adjacent the support posts, and can then be lifted to the correct height. Pipe saddles 14 can then be used to attach the pipe to the post at the correct height (it being realised that the tube can slide relative to the pipe saddles).

At the two end posts (FIG. 1 showing one end post 12), the line member 17 is cut away from the rest of tube 15 to expose it and is wound around post 12 and tied off in the usual manner. By removing line member 17 from tube 15 it can be seen that tube 15 is itself not perforated and fluid can still pass through tube 15 without leakage. The portion of tube 15 (see reference numeral 22 in FIG. 1), which has been separated from wire 17 can then be attached to an inground water supply pipe 23 in the usual manner.

The tube arrangement according to the invention can be manufactured by extrusion such that the wire is contained within the walls of the tube. One method is to use a cross-head extruder with the wire being drawn through the extrusion die.

The tube arrangement according to the invention has a number of benefits.

Labour costs for installation are significantly reduced since only one installation has to take place with no special tool or clips.

The tube is held taut along its entire length reducing or eliminating sagging and thus preventing water from running along the line and puddling.

The tubing can be adequately tensioned simply by tensioning the line member, unlike the traditional method which required the tube to be tensioned separately of the wire, which is quite difficult given the softness of the plastic material.

By having the line member integral with the tube, the tube is prevented from rotating or twisting ensuring that sprays or drippers stay in the right position and perform as specified.

It is preferred that the tube has a number of spaced apart integral drippers 30. The drippers 30 are formed from thermoplastic and have a cylindrical sleeve, a boat-shaped, or other shaped configuration and are fitted inside the tube. The drippers 30 can be of known labyrinth types which can be pressure compensating or non-pressure compensating. Conventional known drippers can be used. These drippers 30 can be fitted inside the tube as the tube is being extruded using a cross-head extruder.

Storage and handling of materials required for installation is made easier since only one product is needed to be handled throughout the operation.

It should be appreciated that the flexible tube arrangement, although being described with reference vineyard irrigation, can also be used in a number of other applications. For instance, irrigation of other crops is envisaged, the tubing can also be used for possibly fire extinguishing purposes, dust control and the like where previously expensive and rigid steel pipes were required. The arrangement can also be used with appropriate sprayers as a humidifier for instance in greenhouses and for the horticulture industry.

It should be appreciated that various other changes or modifications may be made to the embodiment described without departing from the spirit and scope of the invention.

I claim:

1. A flexible irrigation tube arrangement comprising:

a flexible plastic tube through which fluid can be conveyed;

a flexible but substantially inextensible line member formed with the tube to allow the tube to be stretched between spaced apart supports without undesirable sagging of the tube; and a series of spaced apart drippers extending from the tube, the drippers having an inlet in fluid communication with the fluid in the tube and an outlet to allow fluid to pass from the tube, wherein the line member allows the tube to be suspended substantially horizontally so that the fluid which passes through the drippers does not run along an outside wall of the tube.

2. The arrangement of claim 1, wherein the tube has a diameter of between about 10 mm–30 mm.

3. The arrangement of claim 1, wherein the line member is selected from the group consisting of a metal wire, plastic wire, or composite wire.

4. The arrangement of claim 3, wherein the line member has a diameter of between about 1 mm–5 mm.

5. The arrangement of claim 3, wherein the line member is sufficiently flexible such that the formed tube, including the line member, can be stored on a roll, or formed into a roll for ease of storage and transportation.

6. The arrangement of claim 1, wherein the line member extends along the tube and is substantially parallel to the longitudinal axis of the tube.

7. The arrangement of claim 6, wherein the line member extends along and through the wall of the tube.

8. The arrangement of claim 6, wherein the tube is provided with a thickened wall portion through which the line member extends.

9. The arrangement of claim 6, wherein the wall of the tube is formed with an opening through which the line member extends.

10. The arrangement of claim 6, wherein the line member is formed integrally with the tube as the tube is being extruded.

11. The arrangement of claim 6, wherein the line member has a degree of longitudinal movement relative to the tube, by which is meant that the line member has a degree of sliding movement.

12. The tube arrangement of claim 1 wherein the drippers comprise cylindrical internal in-line drippers.

13. The tube arrangement of claim 6, wherein a thickened wall portion of the tube is formed with an opening through which the line member extends.

* * * * *